United States Patent
Akkarakaran et al.

(10) Patent No.: US 10,356,812 B2
(45) Date of Patent: Jul. 16, 2019

(54) VARIABLE-LENGTH TRANSMISSION SCHEMES

(71) Applicant: QUALCOMM Incorporated, San Diego, CA (US)

(72) Inventors: Sony Akkarakaran, Poway, CA (US); Tao Luo, San Diego, CA (US); Makesh Pravin John Wilson, San Diego, CA (US); Sumeeth Nagaraja, San Diego, CA (US); Kaushik Chakraborty, San Diego, CA (US); Wooseok Nam, San Diego, CA (US); Shengbo Chen, San Diego, CA (US); Xiao feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/888,851

(22) Filed: Feb. 5, 2018

(65) Prior Publication Data
US 2018/0227945 A1    Aug. 9, 2018

Related U.S. Application Data

(60) Provisional application No. 62/455,341, filed on Feb. 6, 2017.

(51) Int. Cl.
| | |
|---|---|
| *H04W 4/00* | (2018.01) |
| *H04W 72/14* | (2009.01) |
| *H04L 5/00* | (2006.01) |
| *H04W 72/12* | (2009.01) |
| *H04W 72/04* | (2009.01) |

(52) U.S. Cl.
CPC ............ *H04W 72/14* (2013.01); *H04L 5/00* (2013.01); *H04L 5/0051* (2013.01); *H04W 72/1289* (2013.01); *H04L 5/001* (2013.01); *H04L 5/0053* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 2017/0215188 A1* | 7/2017 | Kim | ................. | H04W 72/0446 370/328 |
| 2017/0332359 A1* | 11/2017 | Tsai | ..................... | H04B 7/0617 370/328 |
| 2018/0035459 A1* | 2/2018 | Islam | ....................... | H04L 1/16 370/328 |

(Continued)

OTHER PUBLICATIONS

International Search Report and Written Opinion—PCT/US2018/017071—ISA/EPO—dated May 11, 2018.

(Continued)

*Primary Examiner* — Anh Vu H Ly
(74) *Attorney, Agent, or Firm* — Arent Fox LLP

(57) ABSTRACT

A method of wireless communication includes receiving, at a user equipment (UE), a grant from a base station on a control channel, the grant including content indicating a mini-slot assigned to the UE. The method may include interpreting the grant based on a current configuration of a data channel to determine the mini-slot. The method may include communicating with the base station during the mini-slot indicated by the grant.

27 Claims, 8 Drawing Sheets

(56) References Cited

U.S. PATENT DOCUMENTS

| | | | |
|---|---|---|---|
| 2018/0049203 A1* | 2/2018 | Xue | H04W 72/0453 |
| | | | 370/328 |
| 2018/0070348 A1* | 3/2018 | Ouchi | H04W 72/0406 |
| | | | 370/328 |
| 2018/0070369 A1* | 3/2018 | Papasakellariou | H04W 48/10 |
| | | | 370/328 |
| 2018/0123765 A1* | 5/2018 | Cao | H04L 1/1861 |
| | | | 370/328 |
| 2018/0131490 A1* | 5/2018 | Patel | H04L 5/0051 |
| | | | 370/328 |
| 2018/0139083 A1* | 5/2018 | Hosseini | H04L 27/2613 |
| | | | 370/328 |
| 2018/0145820 A1* | 5/2018 | Golitschek Edler von Elbwart | H04L 5/005 |
| | | | 370/328 |

OTHER PUBLICATIONS

QUALCOMM Incorporated: "Summary of [86-19] Discussion on Slot Structure Use Cases", 3GPP Draft; R1-1610128 Summary of 86-19 Time Domain Structure Use Case, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 18, 2016, XP051160530, Retrieved from the Internet: URL:http://www.3gpp.org/ftp/tsg_ran/WG1_RL1/TSGR1_86b/Docs/ [retrieved on Oct. 18, 2016], 21 pages.

* cited by examiner

VARIABLE-LENGTH TRANSMISSION SCHEMES

This application claims priority to U.S. Provisional Application No. 62/455,341 filed Feb. 6, 2017, titled "VARIABLE-LENGTH TRANSMISSION SCHEMES," which is assigned to the assignee of the current application and hereby incorporated by reference in its entirety.

BACKGROUND

Aspects of the present disclosure relate generally to wireless communication networks, and more particularly, to variable-length transmission schemes.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, NR supports mini-slot assignments, but a question remains as to how a mini-slot transmission may be efficiently scheduled. As referred to herein, in some cases, a mini-slot is a subset of contiguous OFDM symbols within a slot, while in other cases, a mini-slot may also span across a slot boundary. Also, a mini-slot may be applicable to both uplink (UL) and downlink (DL). Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure relates to limiting overhead needed to specify a mini-slot start and duration. In an aspect, the disclosure includes a method of wireless communications including receiving, at a user equipment (UE), a grant from a base station on a control channel, the grant including content indicating a mini-slot assigned to the UE. The method may include interpreting the grant based on a current configuration of a data channel to determine the mini-slot. The method may include communicating with the base station during the mini-slot indicated by the grant.

In another aspect, the disclosure provides a UE for wireless communications including a memory configured to store instructions and at least one processor coupled with the memory and configured to execute the instructions to receive, at the UE, a grant from a base station on a control channel, the grant including content indicating a mini-slot assigned to the UE. The described aspects may include interpreting, by the UE, the grant based on a current configuration of a data channel to determine the mini-slot. The described aspects may include, communicating, by the UE, with the base station during the mini-slot indicated by the grant.

In another aspect, the disclosure provides a UE for wireless communications. The UE may include means for receiving, from a base station, a grant on a control channel, the grant including content indicating a mini-slot assigned to the UE. The UE may include means for interpreting the grant based on a current configuration of a data channel to determine the mini-slot. The UE may include, means for communicating with the base station during the mini-slot indicated by the grant.

In another aspect, the disclosure provides a computer-readable medium storing computer code executable by a processor for wireless communications. The computer-readable medium may include code to receive, by a UE from a base station, a grant on a control channel, the grant including content indicating a mini-slot assigned to the UE. The computer-readable medium may include code to interpret, by the UE, the grant based on a current configuration of a data channel to determine the mini-slot. The computer-readable medium may include code to communicate, by the UE with the base station, during the mini-slot indicated by the grant.

In another aspect, the disclosure includes method of wireless communications including assigning, by a base station, a mini-slot having a start symbol and a duration to a UE. The method may include determining grant content for the UE based on the current configuration of the data channel, the grant content being different than the start symbol and duration. The method may include transmitting the grant from the base station on a control channel, the grant including the grant content. The method may include communicating with the UE during the mini-slot.

In another aspect, the disclosure provides a base station for wireless communications including a memory configured to store instructions and at least one processor coupled with the memory and configured to execute the instructions assigning, by the base station, a mini-slot having a start symbol and a duration to a UE. The described aspects may include determining, by the base station, grant content for the UE based on the current configuration of the data channel, the grant content being different than the start symbol and duration. The describe aspects may include transmitting the grant from the base station on a control channel, the grant including the grant content. The described aspects may include communicating with the UE during the mini-slot.

In another aspect, the disclosure provides a base station for wireless communications. The base station may include means for assigning, by the base station, a mini-slot having a start symbol and a duration to a UE. The described aspects may include means for determining, by the base station, grant content for the UE based on the current configuration of the data channel, the grant content being different than the start symbol and duration. The describe aspects may include means for transmitting the grant from the base station on a control channel, the grant including the grant content. The described aspects may include means for communicating with the UE during the mini-slot.

In another aspect, the disclosure provides a computer-readable medium storing computer code executable by a processor for wireless communications. The computer-readable medium may include code to assign, by a base station, a mini-slot having a start symbol and a duration to a UE. The computer-readable medium may include code to determine grant content for the UE based on the current configuration of the data channel, the grant content being different than the start symbol and duration. The computer-readable medium may include code to transmit the grant from the base station on a control channel, the grant including the grant content. The computer-readable medium may include code to communicate with the UE during the mini-slot.

Moreover, the present disclosure also includes apparatus having components or configured to execute or means for executing the above-described methods, and computer-readable medium storing one or more codes executable by a processor to perform the above-described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
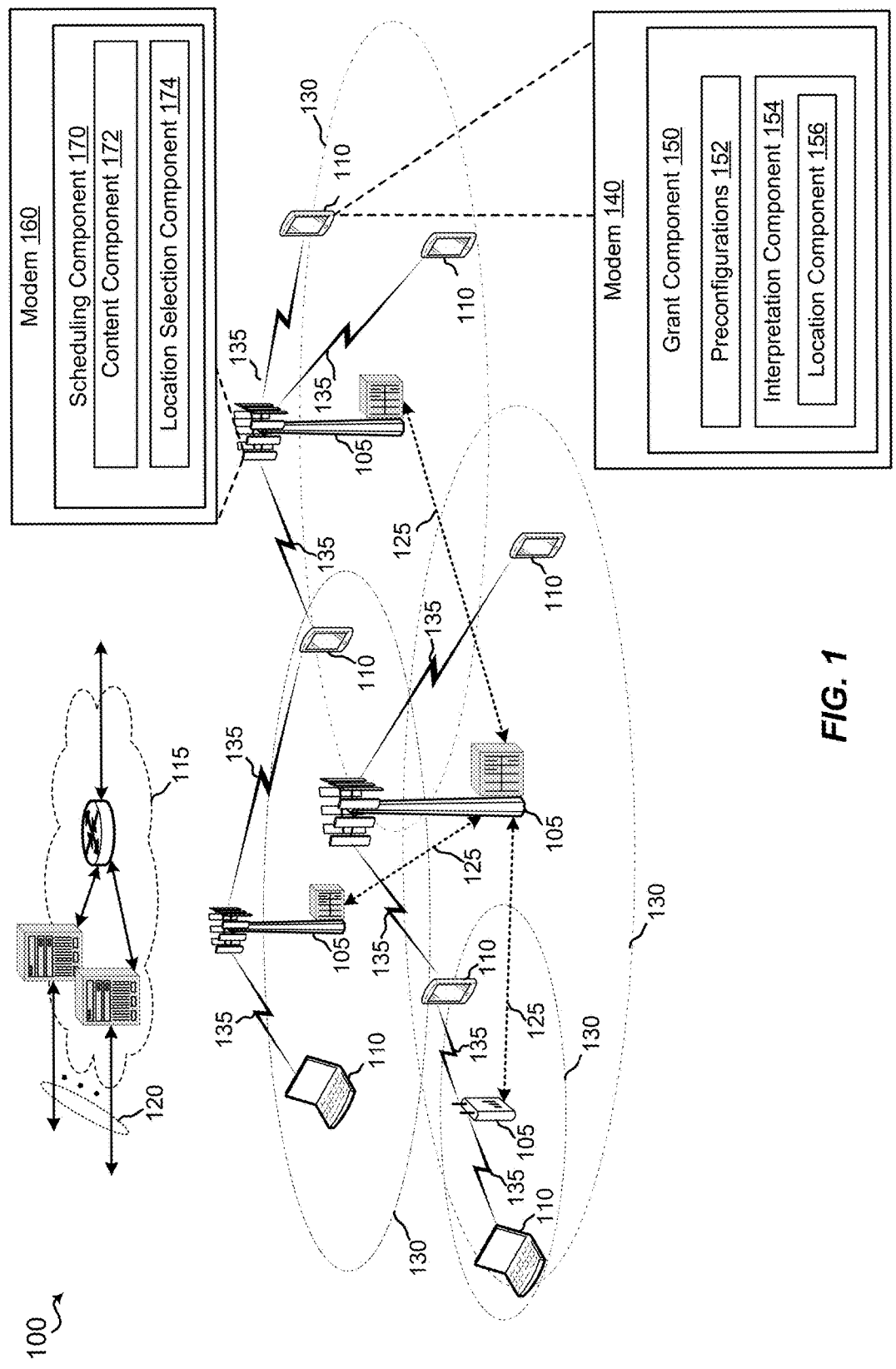
FIG. 1 is a schematic diagram of an example of a wireless communication network including at least one user equipment (UE) having a grant component configured according to this disclosure to interpret a grant according to a current configuration.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure provides various techniques for reducing overhead in a grant indicating a mini-slot for a UE to use for communications. In NR communications, a UE may be scheduled on a mini-slot including one or more contiguous OFDM symbols. A mini-slot may be entirely within a slot or span consecutive slots. The length of the mini-slot may be variable. A mini-slot may be specified by a start symbol and a duration. The flexibility of mini-slots may allow other UEs to be assigned other mini-slots. Reducing the overhead from signaling the assigned mini-slot may improve efficiency and allow a higher ratio of data to signaling to be transmitted. In an aspect, the disclosed techniques use the current configuration of the data channel to reduce the bits used for signaling the mini-slot or other communication parameters in a grant. In an example, the current configuration reduces the number of available mini-slots, so only an index into the available mini-slots is transmitted. In another example, the location of a grant within a control channel may indicate a type of mini-slot. Accordingly, the content of the grant may be reduced based on the known type of mini-slot. In the case where a UE is assigned multiple mini-slots, the mini-slots may be aggregated. The grant may include a bit mask indicating the mini-slots allocated to the UE.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a grant component 150 configured to receive a grant from a base station 105 indicating a mini-slot in which the UE 110 is to communicate, as described in further detail below. Further, wireless communication network 100 includes at least one base station 105 with a modem 160 having a scheduling component 170 configured to transmit grants indicating a mini-slot for communication with a UE, as described in more detail below. In an aspect, the operation of grant component 150 and/or scheduling component 170 may limit overhead needed to specify a start and a duration of a mini-slot.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), medium access control (MAC), etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

In an aspect, the grant component 150 of the UE 110 may include one or more preconfigurations 152. For example, a memory or other computer-readable storage medium may store definitions of data channel configurations for the preconfigurations 152. The data channel configurations may be defined by a standard and/or signaled by the base station 105, for example, as system information. The grant component 150 may select a current configuration from the preconfigurations 152 based on signaling from the base station 105. For example, the grant component 150 may receive L1 or DCI signaling indicating one of the preconfigurations 152 to select as the current configuration.

The grant component 150 may include an interpretation component 154. The interpretation component 154 may include hardware, firmware, and/or software code executable by a processor for interpreting a grant based on a current configuration of a data channel to determine an assignment of resources. For example, the interpretation component 154 may be or include a decoder that maps received bits of the grant 222 to a start symbol and the duration of a mini-slot. As another example, the interpretation component 154 may determine an index based on the received bits and map the index to a preconfigured mini-slot.

The interpretation component 154 may include a location component 156. The location component 156 may include hardware, firmware, and/or software code executable by a processor for determining a property of a mini-slot based on a location of the grant within the control channel and the current configuration. The location component 156 may determine the location of the grant within the control channel. The location component 156 may then determine the property based on the location. For example, the location component 156 may use a mapping associated with the current configuration (e.g., stored in preconfigurations 152) to determine a property of the mini-slot based on the location.

In an aspect, the scheduling component 170 of a base station 105 may include a content component 172. The content component 172 may include hardware, firmware, and/or software code executable by a processor for determining grant content for the UE based on the current configuration of the data channel, the start symbol, and the duration. In an aspect, for example, the content component 172 may be or include an encoder that encodes the start symbol and duration of the mini-slot based on the current configuration. In another aspect, the content component 172 may map the start symbol and duration to an index of a preconfigured mini-slot, for example, based on stored definitions of the preconfigured mini-slots.

The scheduling component 170 may include a location selection component 174. The location selection component 174 may include hardware, firmware, and/or software code executable by a processor for determining a location of the grant within the control channel based on a property of a mini-slot based and the current configuration. For example, the location selection component 174 may use a mapping associated with the current configuration (e.g., stored in memory) to determine a location based on the property.

Figure 2:
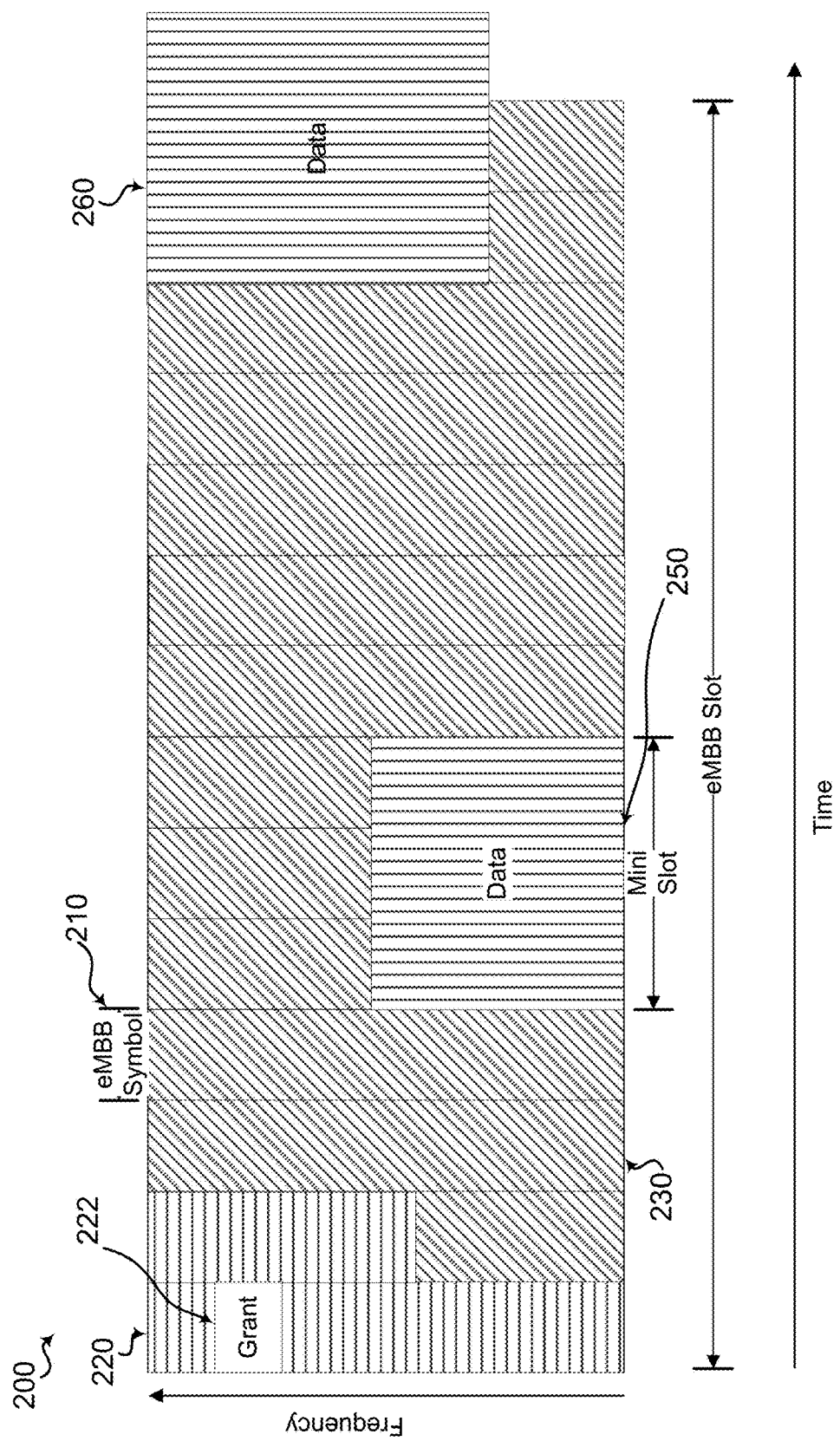
FIG. 2 is a resource diagram illustrating an example slot including a plurality of mini-slots.

FIG. 2 illustrates a resource diagram showing an example of an enhanced mobile broadband (eMBB) slot 200. In the time domain, the eMBB slot 200 may include multiple eMBB symbol periods 210. For example, the illustrated eMBB slot 200 includes 14 eMBB symbol periods 210 (note: for drawing clarity, only the fourth eMBB symbol period is identified by reference number 210). In the frequency domain, the bandwidth may be divided into frequency sub-carriers. An OFDM numerology may include a combination of a symbol period and sub-carrier spacing that produces orthogonal symbols. The combination of sub-carrier and symbol period may be referred to as a resource element (RE), which may be allocated by a base station 105. An eMBB transmission in the eMBB slot 200 may include an eMBB control channel 220 and an eMBB data channel 230.

A base station 105 may schedule a UE for communication in either the uplink or the downlink using a mini-slot. A mini-slot may be a set of contiguous symbols. The symbols may be all or a subset of all the symbols within a slot, and/or may extend between consecutive slots. For example, the mini-slot 250 may use three consecutive symbols. As another example, the mini-slot 260 may use three consecutive symbols extending from a first slot 200 into a second slot (not shown). In this case, which should not be construed as limiting, each mini-slot 250 and/or 260 includes a subset of the RE's of the corresponding eMBB symbol period 210.

The base station may 105 may transmit a grant 222 or assignment in the control channel 220 to indicate the resources assigned for a communication. Although the ability to assign resources at the mini-slot granularity provides the base station 105 with additional flexibility in assigning resources, the resources used for the control channel 220 to indicate the assigned resources may impose a substantial overhead. The present disclosure provides techniques for reducing the overhead.

In one implementation of the present disclosure, which may be referred to as a direct approach, an assignment grant (e.g., UL or DL DCI over PDCCH) may be configured to contain indicators of a start and a duration of an assignment. For example, if a slot has n=14 OFDM symbols, then a start of assignment is at symbol m (=1, 2, . . . or n), and duration is d (=1, 2, . . . or n+1−m) if the mini-slot is constrained to lie wholly within the slot, or d (=1, 2, . . . , or n) if the mini-slot is not constrained to lie wholly within the slot. For instance, $\log 2(n)$ bits may be used to specify m, and $\log 2(n)$ bits may be used to specify d. For example, the grant 222 may specify a mini-slot 250 as (m=5, d=3), which would use 8 bits (e.g., (log 2(14)+log 2(14)=3.80+3.80=7.60). Alternatively, in a possibly more efficient implementation, $\log 2(n*(n+1)/2)$ bits may specify one out of all possible combinations of (m,d) for the case when the mini-slot is constrained to lie wholly within the slot. Alternatively, m and d may be jointly encoded into a single value that is transmitted in the grant and decoded to recover the m and d values at the receiver.

In another implementation of the present disclosure, overhead may be reduced with pre-configured slots, where side-information about the slot-structure reduces the number of possible combinations of the start and the duration of the mini-slot.

Figure 3:
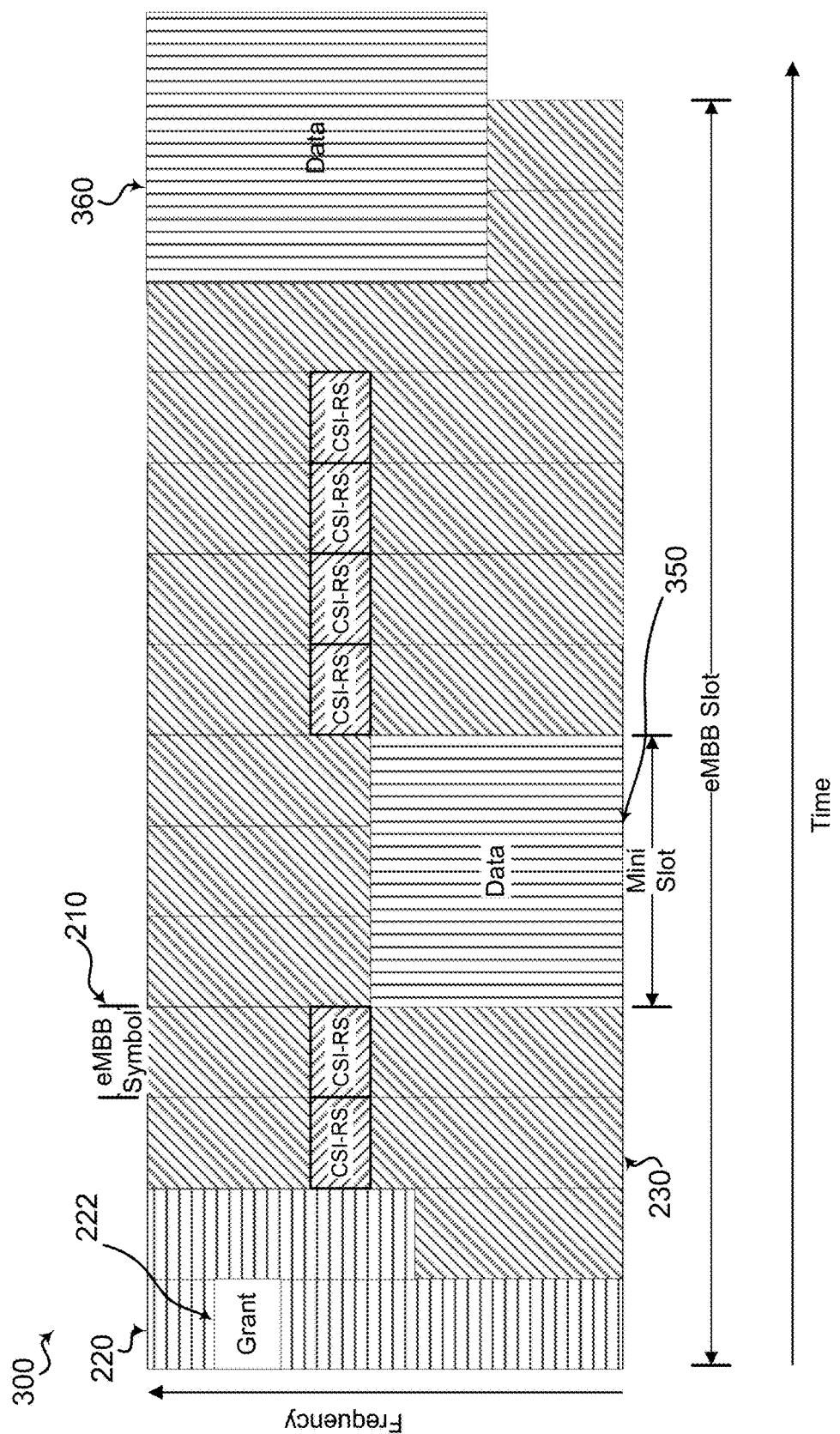
FIG. 3 is a resource diagram illustrating another example slot including reserved resources limiting the locations of mini-slots.

For example, a portion of the eMBB slot 200 may have been pre-configured to be used for modulation and reference signal (MRS) or cell specific reference signal (CSI-RS) training for one UE or for all UEs in the cell. In this case, fewer OFDM symbols are available for regular data (e.g., PDSCH or PUSCH) scheduling. Accordingly, the unavailable resources may be skipped when indicating the start symbol and duration of the mini-slot. Therefore, the start symbol and duration indication may use fewer bits. For example, in FIG. 3, the third ($3^{rd}$), fourth ($4^{th}$), and eighth ($8^{th}$) through eleventh ($11^{th}$) eMBB symbol periods 210 may be utilized for transmitting CSI-RS. These eMBB symbol periods 210 including the CSI-RS may be subtracted from n, resulting in n=8. The grant 222 may indicate the mini-slot 350 as (m=3, d=3), which would use only 6 bits (e.g., (log 2(8)+log 2(8)=3+3=6). Similarly, the mini-slot 360 may be indicated as (m=7, d=3), which would also use only 6 bits.

Figure 4:
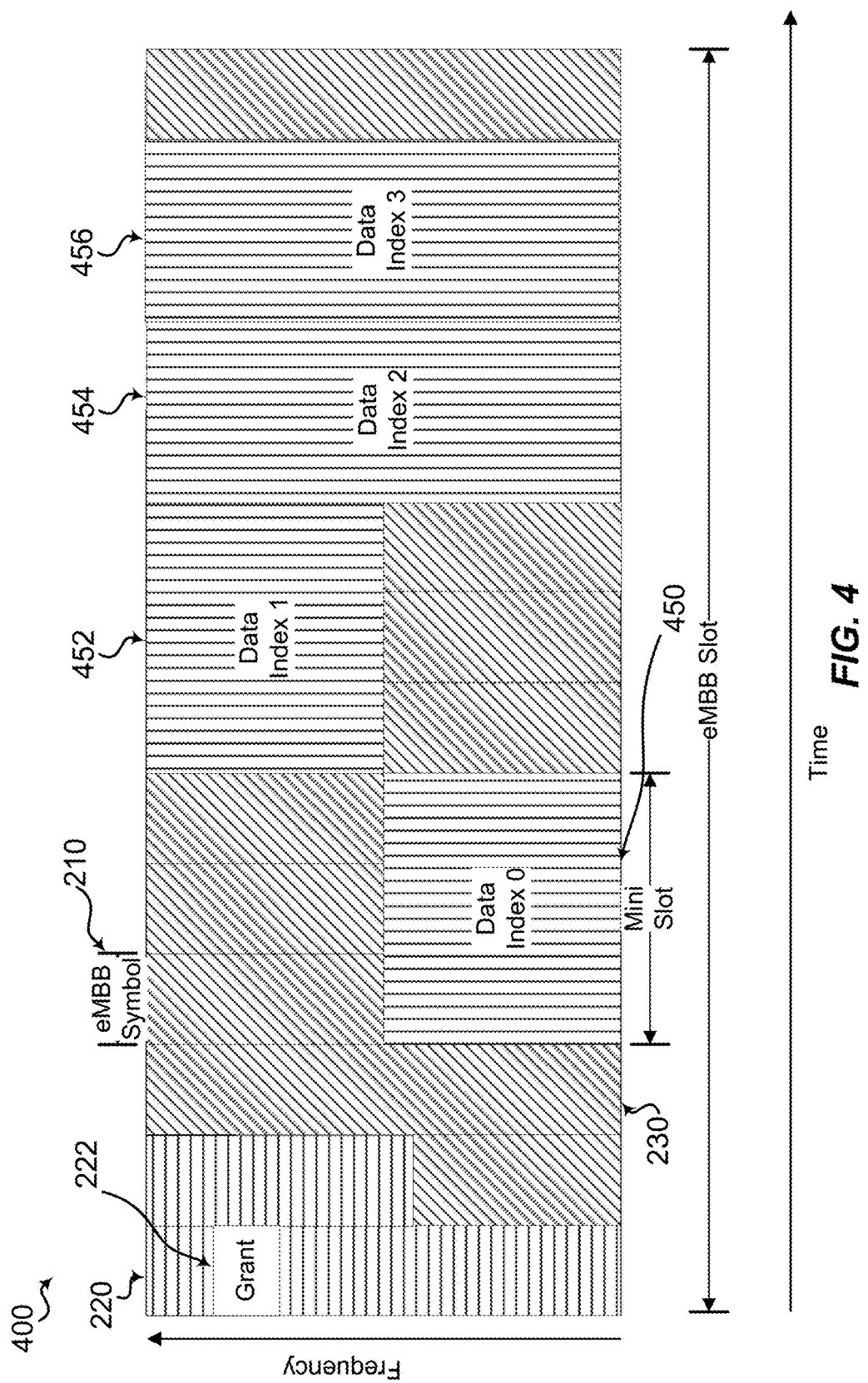
FIG. 4 is a resource diagram illustrating another example slot including pre-configured mini-slot locations.

Also, for example, certain slots may have been pre-configured with a fixed partitioning into mini-slots. For example, in FIG. 4, the slot 400 may include defined mini-slots 450, 452, 454, and 456. The mini-slot 450 may be assigned index 0 and use three symbols of a first sub-band, mini-slot 452 may be assigned index 1 and use 3 symbols of a second sub-band, mini-slot 454 may be assigned index 2 and use two symbols of an allocated bandwidth, and mini-slot 456 may be assigned index 3 and use two symbols of the allocated bandwidth. In this case, the grant 222 only needs to signal the relevant mini-slot index to indicate the resources of the mini-slot. In another example, not shown, if the slot is pre-configured with no partitioning (e.g., a single mini-slot is equal to the slot), then no signaling is needed. Such pre-configuration may be indicated via prior RRC signaling, or in the master information block (MIB)/minimum system information block (mSIB)/system information block (SIB). Also, the pre-configuration may be reconfigured through L1/DCI signaling that selects one among several possible pre-configured patterns, by signaling an index for the list of possible patterns, or by signaling the difference between the index and the previously used index. In another alternative, such pre-configuration may be based on a slot, subframe or frame index. For example, a particular pre-configuration (e.g., assigning mini-slot 450) may apply to the 3rd slot in each subframe. Also, such a pre-configuration may apply to a single UE, a group of UEs, or all UEs in the cell.

In another aspect of reducing assignment overhead, the present disclosure may use a different interpretation of the mini-slot assignment bits when the slot within which the assigned mini-slot begins has such a preconfigured structure. The different interpretations of the mini-slot assignment bits allows fewer bits for such signaling. The unused bits may be deleted from the assignment grant payload, used as additional parity/CRC bits, or used to signal other information.

In another implementation, the present disclosure may reduce overhead using a grant location. For instance, the time and/or frequency domain location of the scheduling grant can convey some or all information about the start and the duration of the mini-slot. This reduces information to be carried in the grant payload. For example, grants received in certain subbands, search-spaces, control channel element (CCE) locations, OFDM symbols, or combinations thereof implicitly indicate that they apply to a particular type of mini-slot, such as: to a mini-slot consisting of the first 3 OFDM symbols in the slot in which the assignment applies; to the whole slot (e.g., no mini-slot partitioning); to a mini-slot starting at a specific OFDM symbol, with the mini-slot duration specified in the grant payload; or, to a mini-slot of a specific duration, with the mini-slot start OFDM symbol specified in the grant payload. The current configuration may define the types of mini-slots available and a parameter indicated by the grant content.

As disclosed above, the bits saved from this implicit information can be deleted from the payload, used as additional parity/CRC bits, or used to signal other information.

The format of such grant information conveyed outside the grant payload could itself depend on slot, subframe, or frame index. The dependency could be pre-configured by RRC, SIB, mSIB or MIB.

Other alternative or additional implementations of the present disclosure may include reducing other grant overhead. That is, the techniques may be applied to any information conveyed within a grant in order to reduce the overhead associated with the conveyed information. The techniques shown earlier reduce the overhead to specify the start and duration of the mini-slot grant. The same or similar techniques can apply to reduce various other overheads associated with a mini-slot, slot, or multi-slot grants, such as but not limited to: a demodulation reference signal (DMRS) pattern to be used with the grant; whether the grant applies to uplink or downlink; whether the grant applies to data (such as PUSCH on UL or PDSCH on DL) or control (such as PUCCH/SRS on UL or MRS/CSI-RS on DL); starting slot index at which the grant applies; bandwidth, rank, modulation, coding scheme, transmit diversity format associated with the grant; numerology (subcarrier spacing) to be used for the grant duration; and/or timing, format, and duration of HARQ Ack associated with the data to be carried on the resource scheduled by the grant.

In another aspect, the present disclosure includes scheduling multiple mini-slots with a single grant. The single grant may schedule multiple mini-slots spread out over one or multiple slots. If most grants schedule only a single mini-slot, fewer bits are needed to simply indicate the mini-slot index, as described earlier. If multiple mini-slots are scheduled more often for the same UE, then more flexibility is achievable using a bit-mask that specifies which mini-slots are scheduled by the grant. Each such scheduled mini-slot could be a separate transmission, or the mini-slots could themselves be aggregated (e.g., a single packet encoded and modulated onto all the mini-slots). Information on which mini-slots are aggregated could also be included in the grant, or could be pre-configured. For example, all mini-slots spanned by the bit-mask are always aggregated, or all time-contiguous mini-slots are aggregated.

Figure 5:
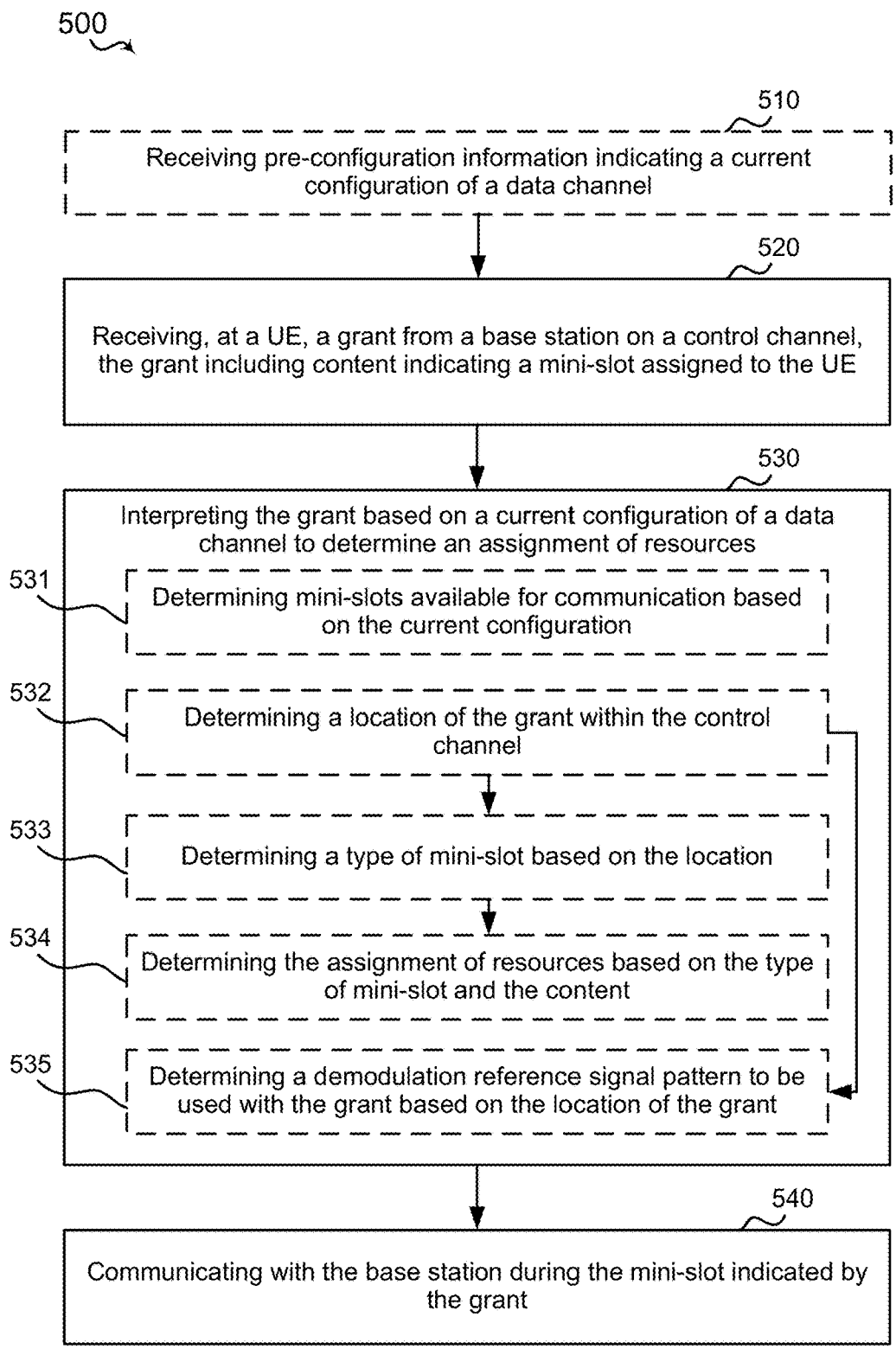
FIG. 5 is a flow chart illustrating an example of a method for receiving an assignment of resources for communication in a mini-slot, in accordance with various aspects of the present disclosure.
Figure 7:
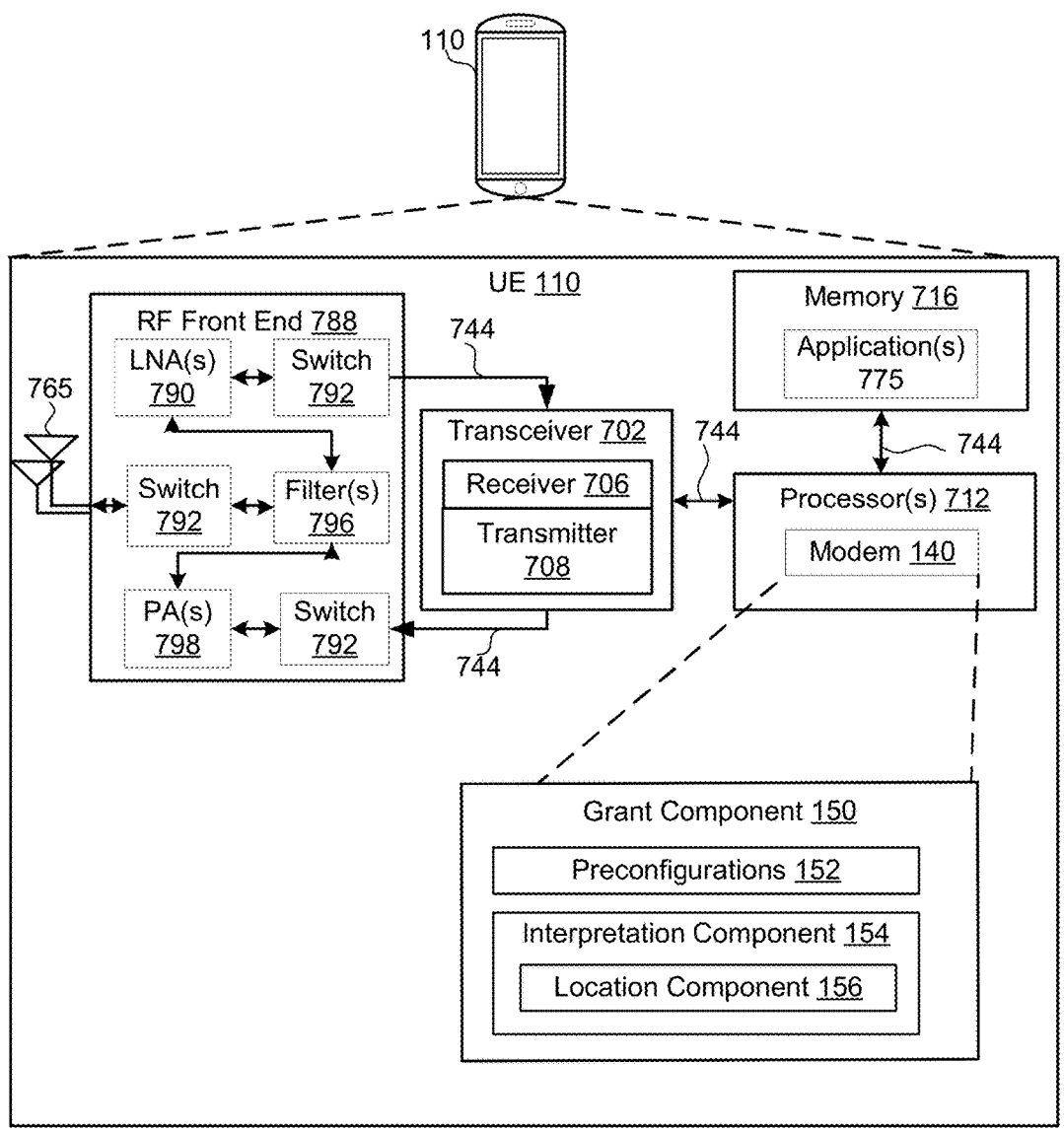
FIG. 7 is a schematic diagram of example components of the UE of FIG. 1.

Referring to FIG. 5, for example, a method 500 of wireless communication in operating a UE 110 according to the above-described aspects to receiving an assignment of resources for communication in a mini-slot includes one or more of the herein-defined actions. The actions may be executed by a processor of the UE such as the processors 712 (FIG. 7).

For example, at block 510, the method 500 optionally includes receiving pre-configuration information indicating the current configuration. For instance, in an aspect, the UE 110 may execute grant component 150 to receive the pre-configuration information indicating the current configuration, as described herein. For example, the grant component 150 may receive the pre-configuration information via prior RRC signaling, or in MIB/mSIB/SIB. The grant component 150 may select the current configuration from the preconfigurations 152 based on the pre-configuration information. For example, the pre-configuration information may be an index for the preconfigurations 152.

At block 520, the method 500 may include receiving, at a UE, a grant from a base station on a control channel, the grant including content indicating a mini-slot assigned to the UE. For instance, in an aspect, the UE 110 may execute grant component 150 to receive at a UE 110 via modem 140, a grant from the base station 105 on a control channel 220, the grant including content indicating a mini-slot 250 assigned to the UE. In an aspect, the content indicating the mini-slot may be specified by fewer bits than necessary to direct encoding of the start slot and duration of the mini-slot.

At block 530, the method 500 may include interpreting the grant based on a current configuration of a data channel to determine an assignment of resources. For instance, in an aspect, the UE 110 may execute grant component 150, interpretation component 154, and/or location component 156 to interpret the grant based on a current configuration of a data channel to determine an assignment of resources. For example, at block 531, the method 500 may include determining mini-slots available for communication based on the current configuration. For example, in an aspect, the UE 110 may execute the interpretation component 154 to determine mini-slots available for communication based on the current configuration. The content of the grant may include an index of an available mini-slot. The index may use fewer bits than specifying a start and a duration of the mini-slot. The interpretation component 154 may select one of the available mini-slots based on the index. As another example, at block 532, the method 500 may include determining a location of the grant within the control channel 220. For example, in an aspect, the UE 110 may execute the location component 156 to determine a location of the grant within the control channel. For example, the location may include subbands, search-spaces, control channel element (CCE) locations, OFDM symbols, or combinations thereof. At block 533, the method 500 may include determining a type of mini-slot based on the location. For example, in an aspect the UE 110 may execute the location component 156 to determine a type of mini-slot based on the location. That is, the location of the grant within the mini-channel may convey information regarding the type of mini-slot. At block 534, the method 500 may include determining the assignment of resources based on the type of mini-slot and the content. For example, the UE 110 may execute the interpretation component 154 to determine the assignment of resources based on the type of mini-slot and the content. In another aspect, at block 535, the method 500 may include optionally determining a demodulation reference signal (DMRS) pattern or other property to be used with the grant based on the location of the grant. For example, the UE 110 may execute the location component 156 to optionally determine a DMRS pattern or other property to be used with the grant based on the location of the grant.

In block 540, the method 300 may include communicating with the base station during a mini-slot indicated by the grant. For instance, the UE 110 may execute the grant component 150 to communicate with the base station during the mini-slot indicated by the grant via the modem 140. The communication may include uplink or downlink communication. The communication properties may be based on the grant and a current configuration. For example, the interpretation component 154 may interpret the grant according to the current configuration to determine any of: a DMRS pattern to be used with the grant; whether the grant applies to uplink or downlink; whether the grant applies to data or control; starting slot index at which the grant applies; bandwidth, rank, modulation, coding scheme, transmit diversity format associated with the grant; numerology to be used for the grant duration; and/or timing, format, and duration of HARQ acknowledgement (Ack) associated with the data to be carried on the resource scheduled by the grant.

Figure 6:
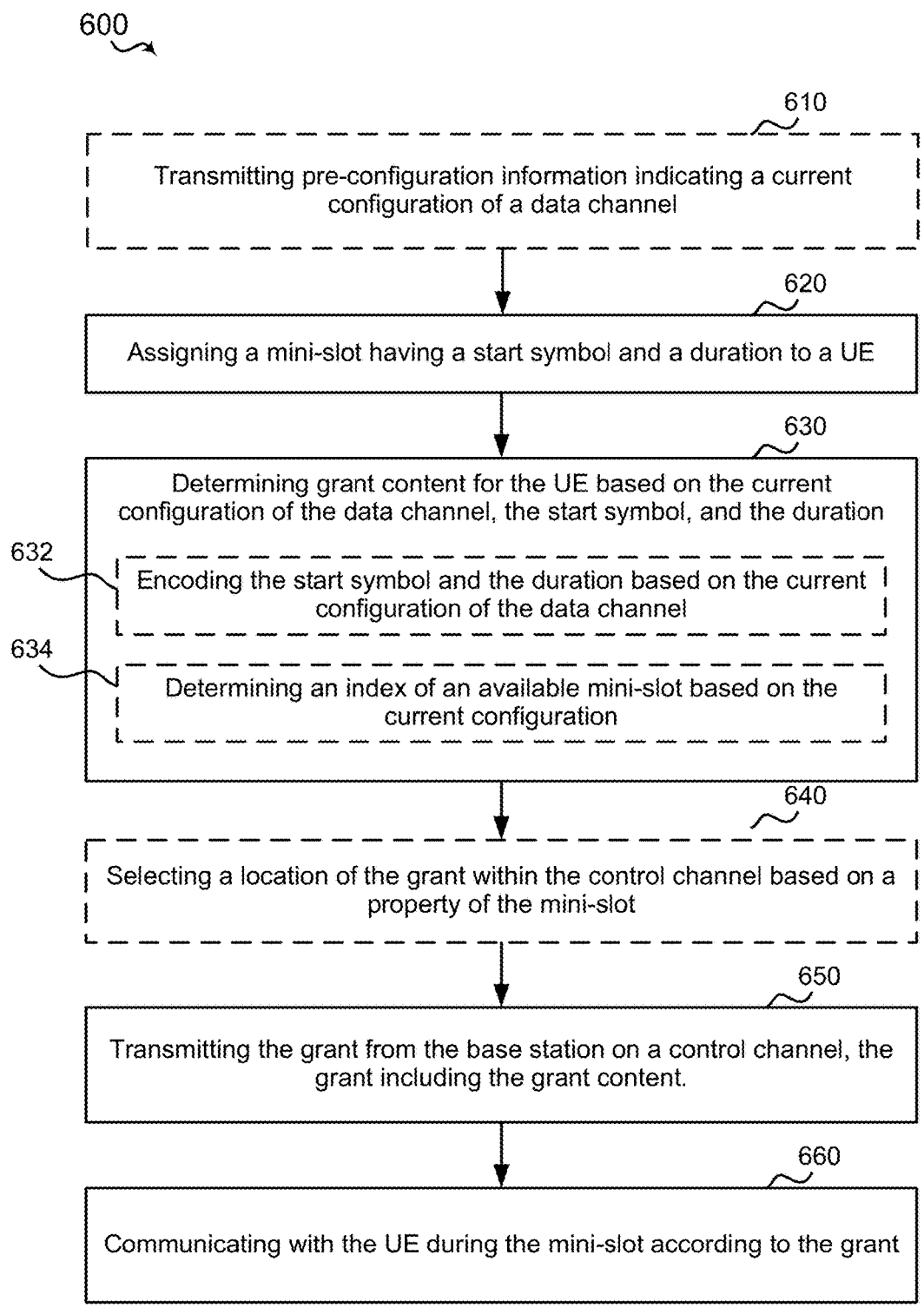
FIG. 6 is a flow chart illustrating an example of a method for transmitting an assignment of resources for communication in a mini-slot, in accordance with various aspects of the present disclosure.
Figure 8:
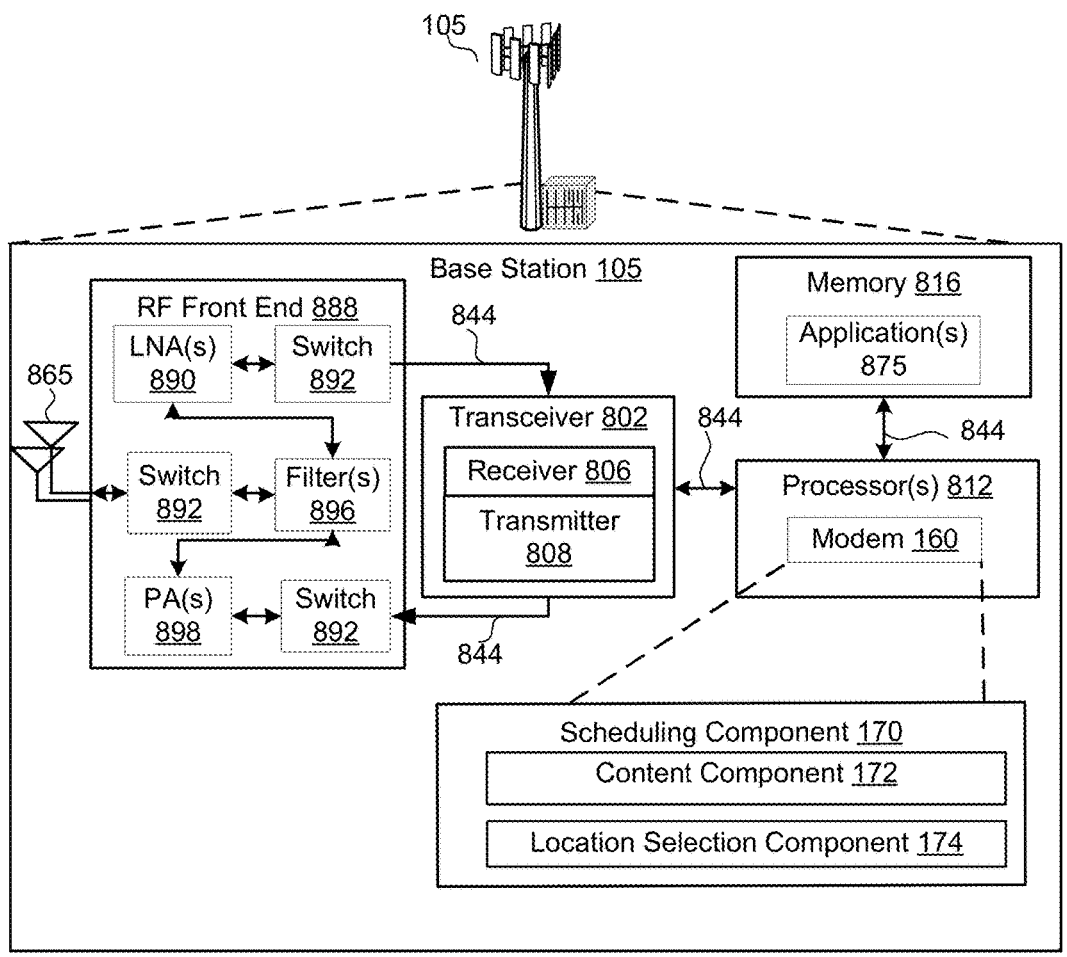
FIG. 8 is a schematic diagram of example components of the base station of FIG. 1.

Referring to FIG. 6, for example, a method 600 of wireless communication in operating base station 105 according to the above-described aspects to schedule a UE for communication within a mini-slot. The actions may be executed by a processor of the base station 105 such as the processors 812 (FIG. 8).

For example, at block 610, the method 600 optionally includes transmitting pre-configuration information indicating a current configuration of a data channel. For instance, in an aspect, the base station 105 may execute scheduling component 170 to transmit pre-configuration information via modem 160 indicating the current configuration of the data channel, as described herein.

At block 620, the method 600 may include assigning a mini-slot having a start symbol and a duration to a UE. For instance, in an aspect, the base station 105 may execute scheduling component 170 to assign a mini-slot having a start symbol and a duration to a UE. The scheduling component 170 may assign the mini-slot based on any scheduling algorithm according to, for example, the network load and priority of data to transmit.

At block 630, the method 600 may include determining grant content for the UE based on the current configuration of the data channel. In an aspect, for example, the base station 105 may execute the scheduling component 170 or content component 172 to determine grant content for the UE 110 based on the current configuration of the data channel. In an aspect, at block 632, the method 600 may include optionally encoding the start symbol and the duration based on the current configuration of the data channel. For example, in an aspect, the base station 105 may execute the content component 172 to optionally encode the start symbol and the duration based on the current configuration of the data channel. For example, the content component 172 may determine a first number of bits encoding the start symbol and a second number of bits encoding the duration as a number of symbols. In another aspect, the grant content may be different than the start symbol and duration. In particular, the grant content may use fewer bits than the start symbol and the duration. The content component 172 may use the current configuration to reduce the number of bits used to indicate the mini-slot as described above. For example, at block 634, the method 600 may include optionally determining an index of an available mini-slot based on the current configuration. For example, in an aspect, the base station 105 may execute the content component 172 to optionally determine an index of an available mini-slot based on the current configuration. The content component 172 may use the index as the content of the grant.

At block 640, the method 600 may optionally include selecting a location of the grant within the control channel based on a property of the mini-slot and the current configuration. In an aspect, for example, the scheduling component 170 and/or location selection component 174 may select the location of the grant within the control channel based on a property of the mini-slot and the current configuration. In an aspect, the property may be one of: a type of the mini-slot; a DMRS pattern to be used with the grant; whether the grant applies to uplink or downlink; whether the grant applies to data or control; a starting slot index at which the grant applies; a bandwidth, rank, modulation, coding scheme, or transmit diversity format associated with the grant; a numerology to be used for the grant duration; a timing, format, and duration of a HARQ Ack associated with the data to be carried on a resource scheduled by the grant; or any combination thereof. The location selection component 174 may determine the property of the mini-slot based on the location of the grant and the current configuration.

At block 650, the method 600 may include transmitting the grant from the base station on a control channel, the grant including the grant content. For instance, the base station 105 may execute the scheduling component 170 to transmit the grant from the base station on the control channel via the modem 160.

At block 660, the method 600 may include communicating with the UE during the mini-slot. For instance, the base station 105 may execute the scheduling component 170 to communicate with the UE during the mini-slot via the modem 160.

Referring to FIG. 7, one example of an implementation of UE 110 may include a variety of components, some of which have already been described above, but including components such as one or more processors 712 and memory 716 and transceiver 702 in communication via one or more buses 744, which may operate in conjunction with modem 140 and grant component 150 to enable one or more of the functions described herein. Further, the one or more processors 712, modem 140, memory 716, transceiver 702, RF front end 788 and one or more antennas 765, may be configured to support voice and/or data calls (simultaneously or non-simultaneously) in one or more radio access technologies.

In an aspect, the one or more processors 712 can include a modem 140 that uses one or more modem processors. The various functions related to grant component 150 may be included in modem 140 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 140 associated with grant component 150 may be performed by transceiver 702.

Also, memory 716 may be configured to store data used herein and/or local versions of applications 775 or grant component 150 and/or one or more of its subcomponents being executed by at least one processor 712. Memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining grant component 150 and/or one or more of its subcomponents, and/or data associated therewith, when UE 110 is operating at least one processor 712 to execute grant component 150 and/or one or more of its subcomponents.

Transceiver 702 may include at least one receiver 706 and at least one transmitter 708. Receiver 706 may include hardware, firmware, and/or software code executable by a processor for receiving data, the code comprising instructions and being stored in a memory (e.g., computer-readable medium). Receiver 706 may be, for example, a radio frequency (RF) receiver. In an aspect, receiver 706 may receive signals transmitted by at least one base station 105. Additionally, receiver 706 may process such received signals, and also may obtain measurements of the signals, such as, but not limited to, Ec/Io, SNR, RSRP, RSSI, etc. Transmitter 708 may include hardware, firmware, and/or software code executable by a processor for transmitting data, the code comprising instructions and being stored in a memory (e.g., computer-readable medium). A suitable example of transmitter 708 may including, but is not limited to, an RF transmitter.

Moreover, in an aspect, UE 110 may include RF front end 788, which may operate in communication with one or more antennas 765 and transceiver 702 for receiving and transmitting radio transmissions, for example, wireless communications transmitted by at least one base station 105 or wireless transmissions transmitted by UE 110. RF front end 788 may be connected to one or more antennas 765 and can include one or more low-noise amplifiers (LNAs) 790, one or more switches 792, one or more power amplifiers (PAs) 798, and one or more filters 796 for transmitting and receiving RF signals.

In an aspect, LNA 790 can amplify a received signal at a desired output level. In an aspect, each LNA 790 may have a specified minimum and maximum gain values. In an aspect, RF front end 788 may use one or more switches 792 to select a particular LNA 790 and its specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and its specified gain value based on a desired gain value for a particular application.

Also, for example, one or more filters 796 can be used by RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, RF front end 788 can use one or more switches 792 to select a transmit or receive path using a specified filter 796, LNA 790, and/or PA 798, based on a configuration as specified by transceiver 702 and/or processor 712.

As such, transceiver 702 may be configured to transmit and receive wireless signals through one or more antennas 765 via RF front end 788. In an aspect, transceiver 702 may be tuned to operate at specified frequencies such that UE 110 can communicate with, for example, one or more base stations 105 or one or more cells associated with one or more base stations 105. In an aspect, for example, modem 140 can configure transceiver 702 to operate at a specified frequency and power level based on the UE configuration of the UE 110 and the communication protocol used by modem 140.

In an aspect, modem 140 can be a multiband-multimode modem, which can process digital data and communicate with transceiver 702 such that the digital data is sent and received using transceiver 702. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 788, transceiver 702) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Referring to FIG. 8, one example of an implementation of base station 105 may include a variety of components, some of which have already been described above, but including components such as one or more processors 812 and memory 816 and transceiver 802 in communication via one or more buses 844, which may operate in conjunction with modem 160 and scheduling component 170 to enable one or more of the functions described herein.

The transceiver 802, receiver 806, transmitter 808, one or more processors 812, memory 816, applications 875, buses 844, RF front end 888, LNAs 890, switches 892, filters 896, PAs 898, and one or more antennas 865 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
receiving, at a user equipment (UE), a grant from a base station on a control channel, the grant including content indicating a mini-slot having a start symbol and a duration assigned to the UE;
interpreting the grant based on a current configuration of a data channel to determine the mini-slot; wherein interpreting the grant includes:
determining a location of the grant within the control channel;
determining a type of mini-slot based on the location; and
determining assignment of resources based on the type of mini-slot and the content; and
communicating with the base station during the mini-slot indicated by the grant.

2. The method of claim 1, wherein interpreting the grant includes decoding the content to obtain a start symbol and the duration based on the current configuration of the data channel.

3. The method of claim 2, wherein the content includes a first number of bits encoding the start symbol and a second number of bits encoding the duration as a number of symbols.

4. The method of claim 1, wherein interpreting the grant includes determining mini-slots available for communication based on the current configuration, wherein the content includes an index of an available mini-slot.

5. The method of claim 1, wherein the grant is applicable to a plurality of mini-slots assigned to the UE and the content includes a bit mask indicating the assigned mini-slots.

6. The method of claim 1, further comprising selecting the current configuration from a plurality of pre-configuration patterns using an index in the received pre-configuration information.

7. The method of claim 1, wherein interpreting the grant includes
determining a demodulation reference signal pattern to be used with the grant based on the location of the grant.

8. The method of claim 1, further comprising receiving pre-configuration information indicating the current configuration.

9. The method of claim 8, wherein the pre-configuration information includes information about a demodulation reference signal pattern to be used with the grant.

10. A user equipment (UE) for wireless communications, comprising:
a memory configured to store instructions; and
a processor coupled with the memory, the processor configured to execute the instructions to:

receive, at the UE, a grant from a base station on a control channel, the grant including content indicating a mini-slot having a start symbol and a duration assigned to the UE;
interpret the grant based on a current configuration of a data channel to determine the mini-slot; wherein the instructions to interpret the grant are further configured to:
determine a location of the grant within the control channel;
determine a type of mini-slot based on the location; and
determine assignment of resources based on the type of mini-slot and the content; and
communicate with the base station during the mini-slot indicated by the grant.

11. The UE of claim 10, wherein the instructions to interpret the grant are further configured to decode the content to obtain a start symbol and the duration based on the current configuration of the data channel.

12. The UE of claim 11, wherein the content includes a first number of bits encoding the start symbol and a second number of bits encoding the duration as a number of symbols.

13. The UE of claim 10, wherein the instructions to interpret the grant are further configured to determine mini-slots available for communication based on the current configuration, wherein the content includes an index of an available mini-slot.

14. The UE of claim 10, wherein the grant is applicable to a plurality of mini-slots assigned to the UE and the content includes a bit mask indicating the assigned mini-slots.

15. The UE of claim 10, further comprising instructions to select the current configuration from a plurality of pre-configuration patterns using an index in the received pre-configuration information.

16. The UE of claim 10, wherein the instructions to interpret the grant are further configured to
determine a demodulation reference signal pattern to be used with the grant based on the location of the grant.

17. The UE of claim 10, further comprising receiving pre-configuration information indicating the current configuration.

18. The UE of claim 17, wherein the pre-configuration information includes information about a demodulation reference signal pattern to be used with the grant.

19. A user equipment (UE) for wireless communications, comprising:
means for receiving, at the UE, a grant from a base station on a control channel, the grant including content indicating a mini-slot having a start symbol and a duration assigned to the UE;
means for interpreting the grant based on a current configuration of a data channel to determine the mini-slot wherein the means for interpreting the grant further comprise:
means for determining a location of the grant within the control channel;
means for determining a type of mini-slot based on the location; and
means for determining assignment of resources based on the type of mini-slot and the content; and
means for communicating with the base station during the mini-slot indicated by the grant.

20. The UE of claim 19, wherein the means for interpreting the grant are configured to decode the content to obtain a start symbol and the duration based on the current configuration of the data channel.

21. The UE of claim 20, wherein the content includes a first number of bits encoding the start symbol and a second number of bits encoding the duration as a number of symbols.

22. The UE of claim 19, wherein the means for interpreting the grant further determine mini-slots available for communication based on the current configuration, wherein the content includes an index of an available mini-slot.

23. The UE of claim 19, wherein the grant is applicable to a plurality of mini-slots assigned to the UE and the content includes a bit mask indicating the assigned mini-slots.

24. The UE of claim 19, further comprising means for selecting the current configuration from a plurality of pre-configuration patterns using an index in the received pre-configuration information.

25. The UE of claim 19, further comprising means for receiving pre-configuration information indicating the current configuration.

26. The UE of claim 25, wherein the pre-configuration information includes information about a demodulation reference signal pattern to be used with the grant.

27. A non-transitory computer-readable medium storing computer code executable by a processor for wireless communications, comprising code for:
receiving, at a user equipment (UE), a grant from a base station on a control channel, the grant including content indicating a mini-slot having a start symbol and a duration assigned to the UE;
interpreting the grant based on a current configuration of a data channel to determine the mini-slot; wherein the interpreting the grant further comprises code for:
determining a location of the grant within the control channel;
determining a type of mini-slot based on the location; and
determining assignment of resources based on the type of mini-slot and the content; and
communicating with the base station during the mini-slot indicated by the grant.

* * * * *